United States Patent
Seeger et al.

(10) Patent No.: US 7,305,393 B2
(45) Date of Patent: Dec. 4, 2007

(54) MOUNTED FILESYSTEM INTEGRITY CHECKING AND SALVAGE

(75) Inventors: James J. Seeger, Portland, OR (US); Thomas K. Clark, Gresham, OR (US); Andreas J. Moran, Tigard, OR (US); Jason C. Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/427,036

(22) Filed: Apr. 29, 2003

(65) Prior Publication Data
US 2004/0220932 A1    Nov. 4, 2004

(51) Int. Cl.
*G06F 17/30*    (2006.01)
(52) U.S. Cl. .......................................... 707/9; 707/203
(58) Field of Classification Search ................ 707/206, 707/1–10, 100–104.1, 200–205; 709/229
See application file for complete search history.

(56) References Cited

U.S. PATENT DOCUMENTS

| 5,043,876 A | * | 8/1991 | Terry ........................... 707/201 |
|---|---|---|---|
| 5,960,446 A | * | 9/1999 | Schmuck et al. ........... 707/205 |
| 6,035,379 A | | 3/2000 | Raju et al. |
| 6,324,581 B1 | * | 11/2001 | Xu et al. ..................... 709/229 |
| 6,389,420 B1 | * | 5/2002 | Vahalia et al. ................. 707/8 |
| 6,564,228 B1 | | 5/2003 | O'Connor |
| 6,665,675 B1 | | 12/2003 | Mitaru |
| 6,912,554 B2 | * | 6/2005 | Yuasa .......................... 707/206 |

OTHER PUBLICATIONS

ScanDisk Informational Document.*

* cited by examiner

*Primary Examiner*—Mohammad Ali
(74) *Attorney, Agent, or Firm*—Lieberman & Brandsdorfer, LLC

(57) ABSTRACT

A method and system for conducting an integrity check of system and user metadata when the metadata is mounted. A filesystem reviewer (48, 74, 84) is embedded within software of a server node. A mutual exclusion lock is obtained on the selected metadata (54, 82, 116, 202, 242, 302). An automated verification of the locked metadata is conducted (58, 86, 120, 156, 206, 246, 306) while the filesystem is mounted. In addition, an automated salvage of the locked metadata may be conducted (62, 90, 124, 158, 210, 250, 310) while the filesystem is mounted. The verification and/or salvage of the locked metadata can be applied to system, user, and/or a portion of the user metadata.

20 Claims, 12 Drawing Sheets

MOUNTED FILESYSTEM INTEGRITY CHECKING AND SALVAGE

BACKGROUND OF THE INVENTION

1. Technical Field

This invention relates to a method and system to conduct a consistency check on a distributed filesystem. More specifically, the invention relates to conducting the consistency check while filesystem metadata is mounted and available to an end user.

2. Description of the Prior Art

Systems and methods for reviewing the consistency of a filesystem are known in the art. FIG. 1 is a block diagram 10 of a node 12 running a single operating system instance. The node 12 has a native filesystem 14 specific to the hardware and operating system of the node 12, and a filesystem reviewer 16. In addition, the node is in communication with local storage media 18 that includes file and system metadata space. The filesystem reviewer 16 functions to conduct consistency checks on filesystem metadata. The filesystem reviewer 16 is not embedded within server software of the node, and as such is not able to obtain mutual exclusion locks on the filesystem metadata. Accordingly, the prior art filesystem reviewer for a node running a single operating system instance does not have the ability to operate while the metadata of the filesystem is mounted.

Similarly, FIG. 2 is a block diagram 20 of a client/server node 22 in communication with a storage area network 30. The client/server node has a native filesystem 24 specific to the hardware and operating system of the client/server node, and a filesystem reviewer 26. In addition, the client/server node 22 is in communication with the storage area network 30 that includes file data space 32 and filesystem metadata space 34. In opening the contents of an existing file object on the storage media in the storage area network 30, a client contacts the client/server node 22 to obtain metadata and locks. Metadata supplies the client with information about a file, such as its attributes and location on storage devices. Locks supply the client with privileges it needs to open a file and read or write data. The client/server node 22 performs a look-up of metadata information for the requested file within the metadata 34 of the storage area network 30. The client/server node 22 communicates granted lock information and file metadata to the requesting client, including the location of all data blocks making up the file. Once the client holds a distributed lock and knows the data block location(s), the client can access the data for the file directly from a shared storage device in communication with the storage area network 30. In addition, the client/server node 22 includes a native filesystem 24 and a filesystem reviewer 26. The filesystem reviewer 26 functions to conduct consistency checks on the filesystem metadata. However, the filesystem reviewer 26 of the client/server node 22 is not embedded within the server software, and as such is not able to obtain mutual exclusion locks on the filesystem metadata Accordingly, the prior art filesystem reviewer for a client/server node in communication with a storage area network does not have the ability to operate while the metadata of the filesystem is mounted.

The prior art solutions for performing a consistency check on the filesystem metadata of a single node as shown in FIG. 1 as well as a distributed system with shared persistent data as shown in FIG. 2 conduct an initial check of the known filesystems at boot time. However, there are limitations associated with limiting a consistency check to boot time. For example, the filesystem metadata is dynamic and during operation of the filesystem the metadata is subject to change. Prior art consistency checks are not available for mounted filesystems. A consistency check on unmounted filesystem metadata requires that some resource in the filesystem be unavailable to a client and/or server node while the consistency check is conducted. Accordingly, there is a need for a tool that enables consistency checks and salvage of inconsistent data to be conducted on a mounted filesystem.

SUMMARY OF THE INVENTION

This invention comprises a system and method for conducting a consistency check on metadata of a distributed filesystem.

In a first aspect of the invention, a method for reviewing a data storage system is provided. A filesystem reviewer is adapted to communicate with metadata of local storage media of the node. A mutual exclusion lock on the metadata is obtained, and an automated consistency check on the locked metadata is performed while the metadata is mounted. In addition, an automated salvage of inconsistent data may be conducted while the metadata is mounted.

In a second aspect of the invention, a data storage review system is provided. A filesystem reviewer is adapted to communicate with metadata of local storage media of the node. A mutual exclusion lock is adapted to be obtained on the metadata. A review manager is adapted to conduct an automated consistency check on the locked metadata while the metadata is mounted. In addition, a salvage manager may be provided to conduct an automated salvage of inconsistent locked and mounted metadata.

In a third aspect of the invention, an article in a computer-readable signal-bearing medium is provided. Means in the medium communicates with metadata of local storage media of the node. Means in the medium are provided for obtaining a mutual exclusion lock on metadata, and for performing an automated consistency check on locked metadata while the metadata is mounted. In addition, means in the medium may be provided to perform an automated salvage of inconsistent locked and mounted metadata.

In a fourth aspect of the invention, a method for reviewing a data storage system is provided. A filesystem reviewer is adapted to communicate with metadata of the shared storage system. A mutual exclusion lock on the metadata is obtained, and an automated consistency check on the locked metadata is performed while the metadata is mounted. In addition, an automated salvage of inconsistent data may be conducted while the metadata is mounted.

In a fifth aspect of the invention, a data storage review system is provided. A filesystem reviewer is adapted to communicate with metadata of the shared storage system. A mutual exclusion lock is adapted to be obtained on the metadata. A review manager is adapted to conduct an automated consistency check on the locked metadata while the metadata is mounted. A salvage manager may be provided to conduct an automated salvage of inconsistent locked and mounted metadata.

In a sixth aspect of the invention, an article in a computer-readable signal-bearing medium is provided. Means in the medium communicates with metadata of the shared storage system. Means in the medium are provided for obtaining a mutual exclusion lock on metadata, and for performing an automated consistency check on locked metadata while the metadata is mounted. In addition, means in the medium may be provided to perform an automated salvage of inconsistent locked and mounted metadata.

In a seventh aspect of the invention, a method for reviewing a filesystem is provided. A mutual exclusion lock on metadata is obtained, and an automated consistency check on the locked metadata is performed while the metadata is mounted. In addition, an automated salvage of inconsistent metadata may be conducted while the metadata is mounted. The metadata may be system metadata, user metadata, or a portion of the user metadata.

In an eighth aspect of the invention, a system for reviewing a filesystem is provided. A mutual exclusion lock is obtained on metadata, and a review manager conducts an automated consistency check on the locked metadata while the metadata is mounted. In addition, a salvage manager may be used to conduct an automated salvage of inconsistent data produced by the review manager. The metadata may be system metadata, user metadata, or a portion of the user metadata.

In a ninth aspect of the invention, an article in a computer-readable signal-bearing medium is provided. Means in the medium for obtaining a mutual exclusion lock on metadata is provided. In addition, means in the medium for performing an automated consistency check on said locked metadata is provided while said metadata is mounted. Means in the medium may be provided to perform an automated salvage of inconsistent data. The metadata may be system metadata, user metadata, or a portion of the user metadata.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a server, a filesystem is provided, wherein the filesystem is in the form of a subtree rooted at a particular directory. The root of the tree is a uniform global namespace of the filesystem that describes the filesystem. A uniform global namespace provides the capability for all clients to have a consistent view of the name tree. Mutual exclusion locks and a temporary shadow copy of data structures are utilized to enable a consistency check of the mounted filesystem, i.e. when the filesystem is available and/or on-line.

Technical Details

Figure 1:
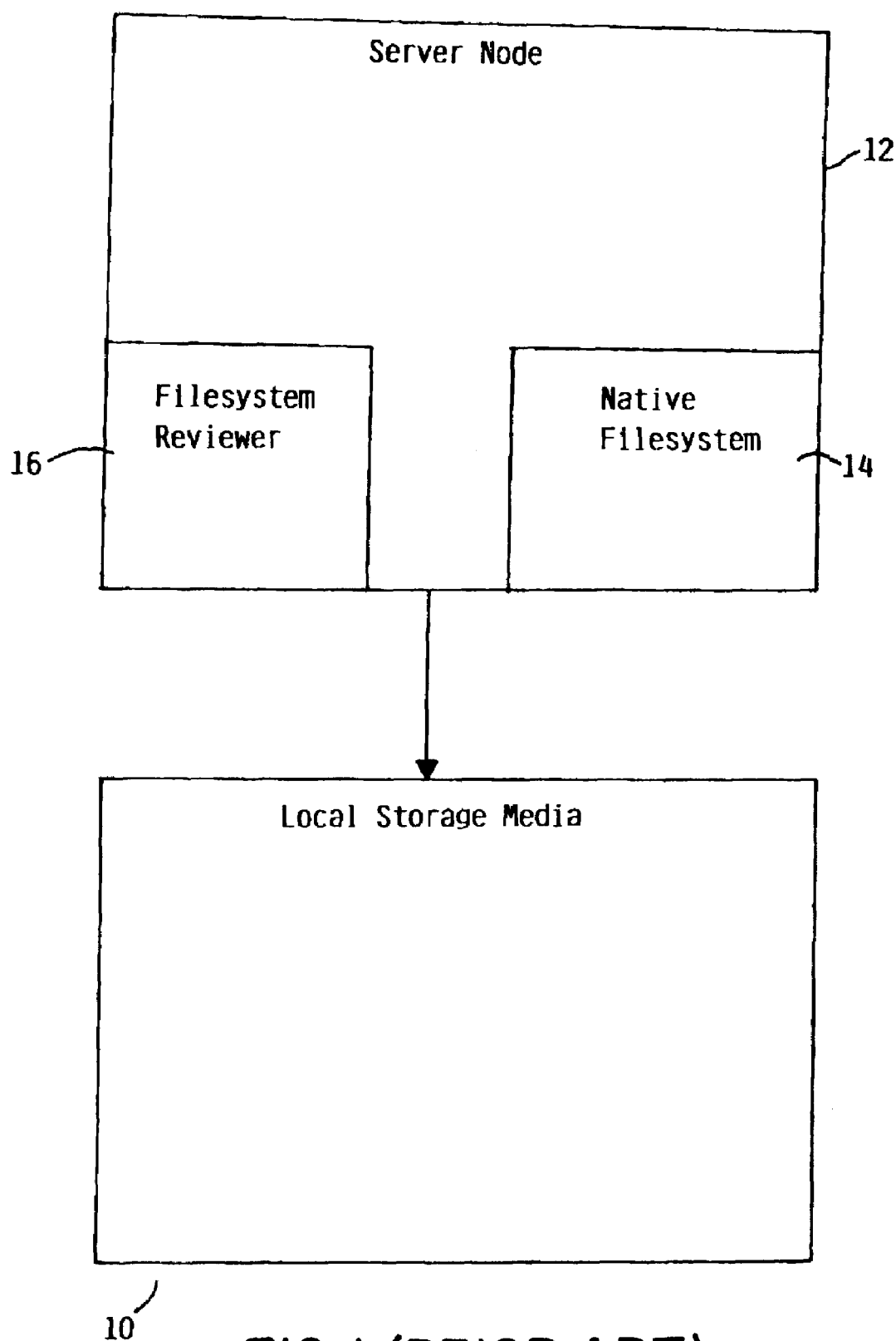
FIG. 1 is a prior art block diagram of a single node with a filesystem reviewer.
Figure 2:
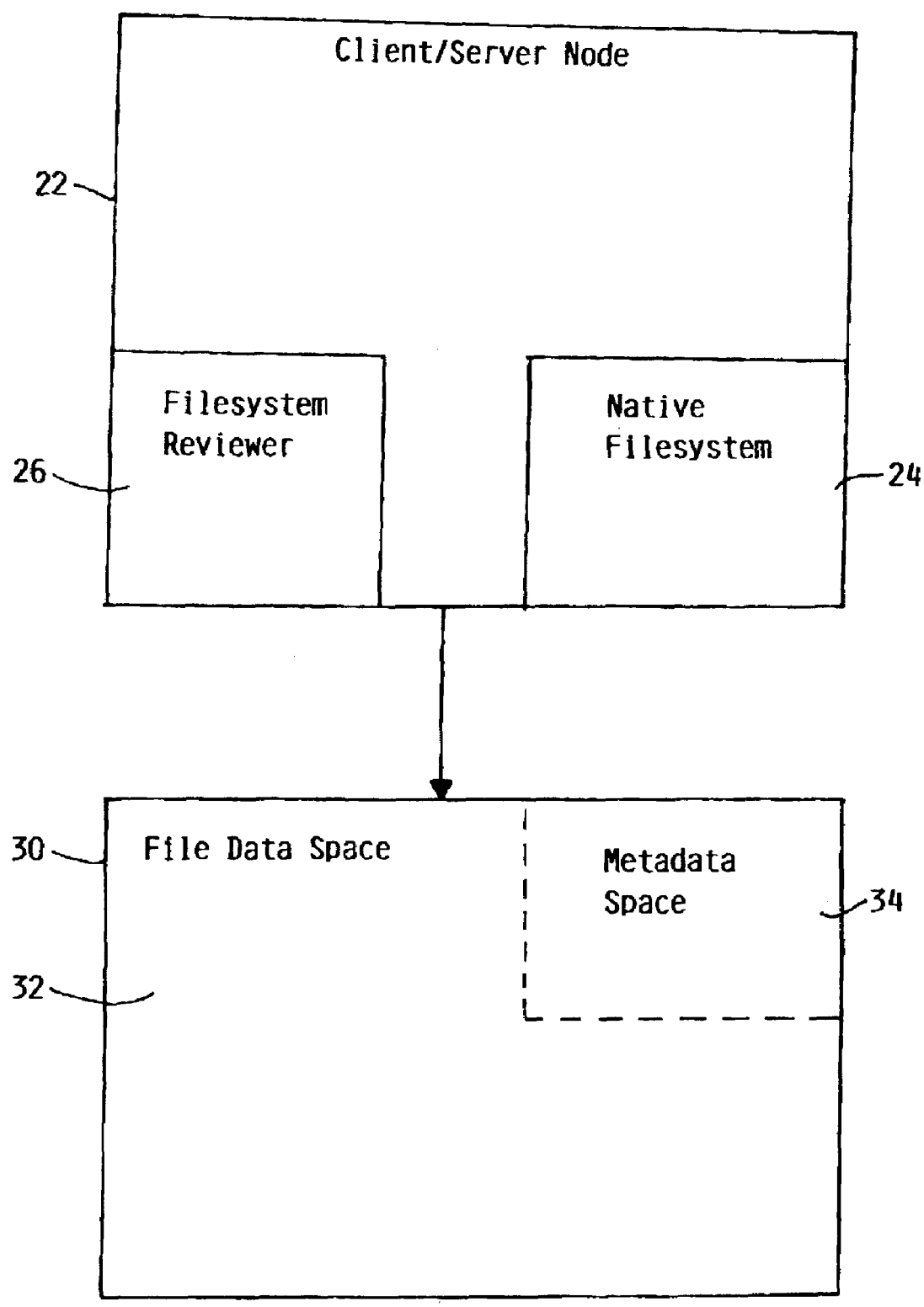
FIG. 2 is a prior art block diagram of a computer system with a server node in communication with a storage area network.
Figure 3:
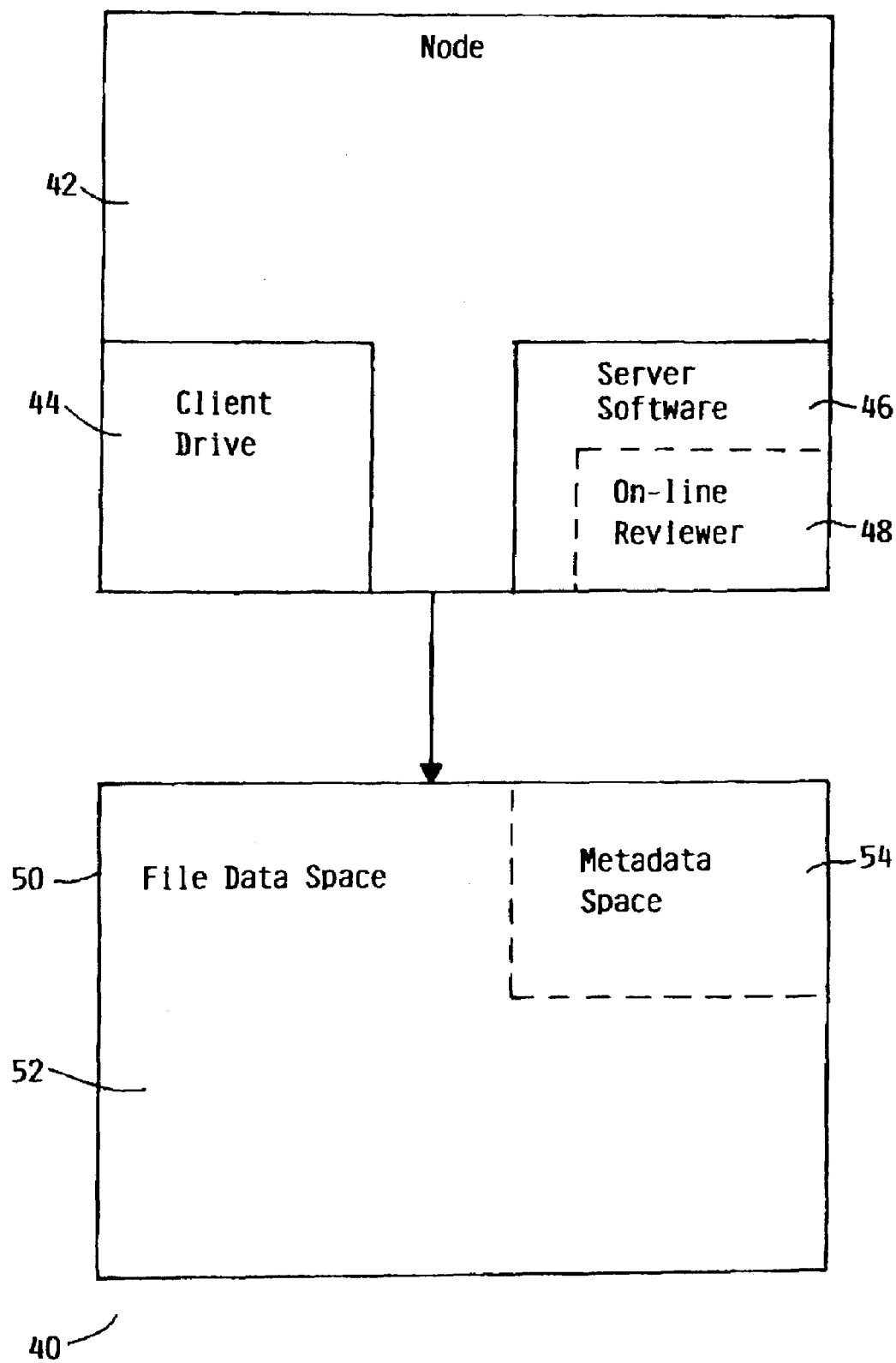
FIG. 3 is a block diagram of a computer system with a single node with an embedded filesystem reviewer
Figure 4:
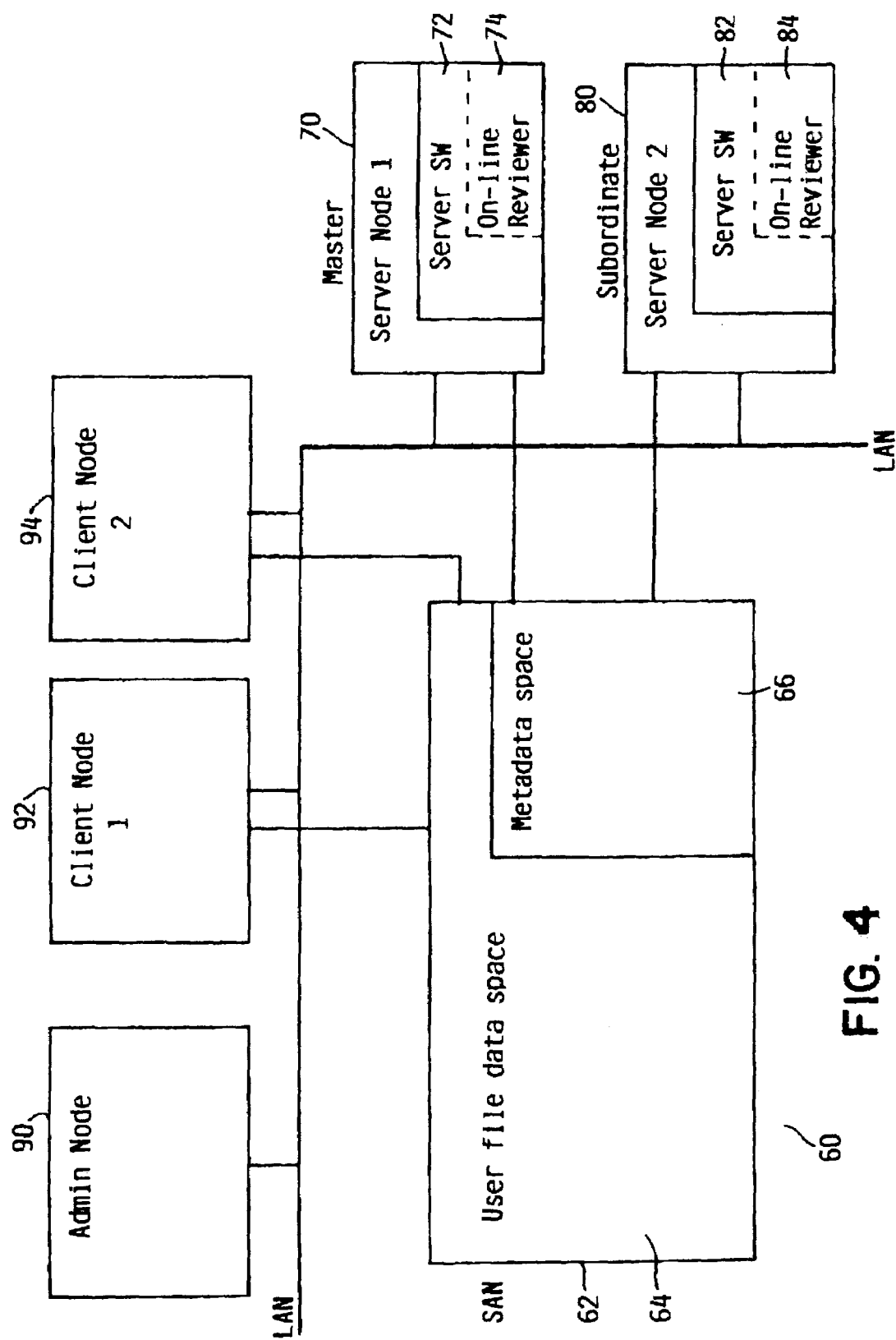
FIG. 4 is a block diagram of a computer system with a server node in communication with a storage area network.

FIG. 3 is a block diagram 40 of a node 42 running a single operating system instance with the filesystem reviewer according to the preferred embodiment. The node has a client driver 44 and server software 46. The server software 46 of the node 42 includes an online filesystem reviewer 48 embedded within the software of the server. The function of the filesystem reviewer 48 is to conduct consistency checks on the metadata. In addition, the node is in communication with local storage media 50. The local storage media 50 includes file data space 52 and metadata space 54. The filesystem reviewer performs I/O to the blacks of matadata space on the local storage media and performs consistency checks based on the data structure(s) being processed on the blocks. Similarly, FIG. 4 is a block diagram 60 of a distributed system with shared persistent storage and an embedded filesystem reviewer according to the preferred enibodirnent of the invention. The distributed system includes a storage area network 62 with multiple server nodes 70 and 80, an administrator node 90, and multiple client nodes 92 and 94. The storage area network 62 has file data space 64 and metadata space 66 The inetadata space is reserved for the server nodes 70 and 80. Each of the client nodes 92 and 94 may access an object or multiple objects stored on the file data space 64 of the storage area network 62, but may not access the metadata space 66. In opening the contents of an existing file object on the storage media in the storage area network 62, a client contacts the server node to obtain metadata and locks. Metadata supplies the client with information about a file, such as its attributes and location on storage devices. Locks supply the client with privileges it needs to open a file and read or write data. The server node performs a look-up of metadata information for the requested file within the metadata space 66 of the storage area network 62. One of the server nodes 70 or 80 communicates granted lock information and file metadata to the requesting client node, including the location of all data blocks making up the file. Once the client node holds a distributed lock and knows the data block location(s), the client node can access the data for the file directly from a shared storage device attached to the storage area network. In addition, each of the nodes 70 and 80 include server software 72 and 82, respectively, with embedded filesystem reviewers 74 and 84. The filesystem reviewers may also request and obtain locks on metadata. Accordingly, the embedded filesystem reviewer may request and obtain a mutual exclusion lock on the requested metadata while the filesystem remains mounted.

Figure 5:
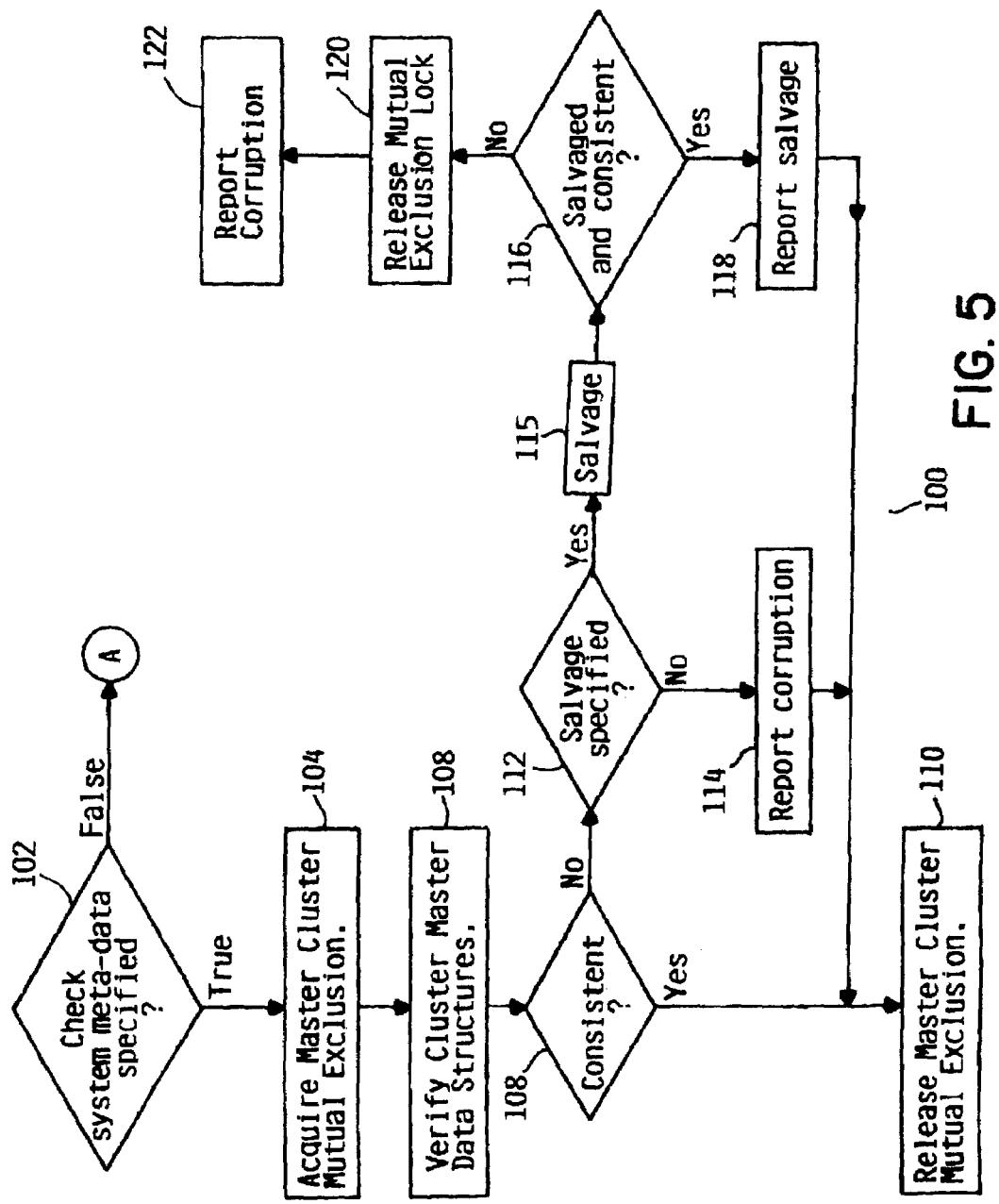
FIG. 5 is a flow chart illustrating the process of verifying consistency of master cluster data structures of system metadata according to the preferred embodiment of this invention, and is suggested for printing on the first page of the issued patent.

FIG. 5 is a flow chart 100 illustrating the process for conducting a consistency check on system metadata. The process is initialized by a query to determine if the operator authorizing the consistency check has specified the verification for system metadata 102. If the response to the query at step 102 is negative, the consistency check will proceed to a subsequent query to determine if the operator authorizing the consistency check has specified verification for user meta data. However, if the response to the query at step 102 is positive, a mutual exclusion lock is obtained on the master cluster data structures 104. Thereafter, a verification of the master cluster data structures is conducted 106. Following steps 104 and 106, a query 108 is conducted to determine if the data within the data structures on which the mutual exclusion lock has been acquired at step 104 is consistent within the rules set for the data, i.e. is the data valid. A positive response to the query at step 108 will complete the consistency check on specified data, and the mutual exclusion lock on the specified data structures is released 110. However, if it is determined that the data verified at step 106 is not consistent, then a subsequent query is conducted to determine if the operator authorized salvage of inconsistent data 12. If the operator did not request that the inconsistent data be salvaged, the corruption in the data is reported 114, and the mutual exclusion lock on the specified data structures is released 110. Alternatively, if the operator requested that the inconsistent data to be salvaged, a salvage of the inconsistent data is conducted 115. Following the salvage operation at step 115, a subsequent query is conducted to determine if the previously inconsistent data being checked has been salvaged and is now consistent 116. Salvage of the inconsistent data at step 115 will result in a production of a report of the salvage 118 followed by release of the mutual exclusion lock on the master cluster data structures 110. However, if the inconsistent data could not be salvaged, the mutual exclusion lock acquired at step 104 is released 120, and the corruption of the data is reported to the operator 122. Accordingly, the steps outlined above describe the process for conducting a consistency check on mounted master cluster data structures of system metadata.

Figure 6:
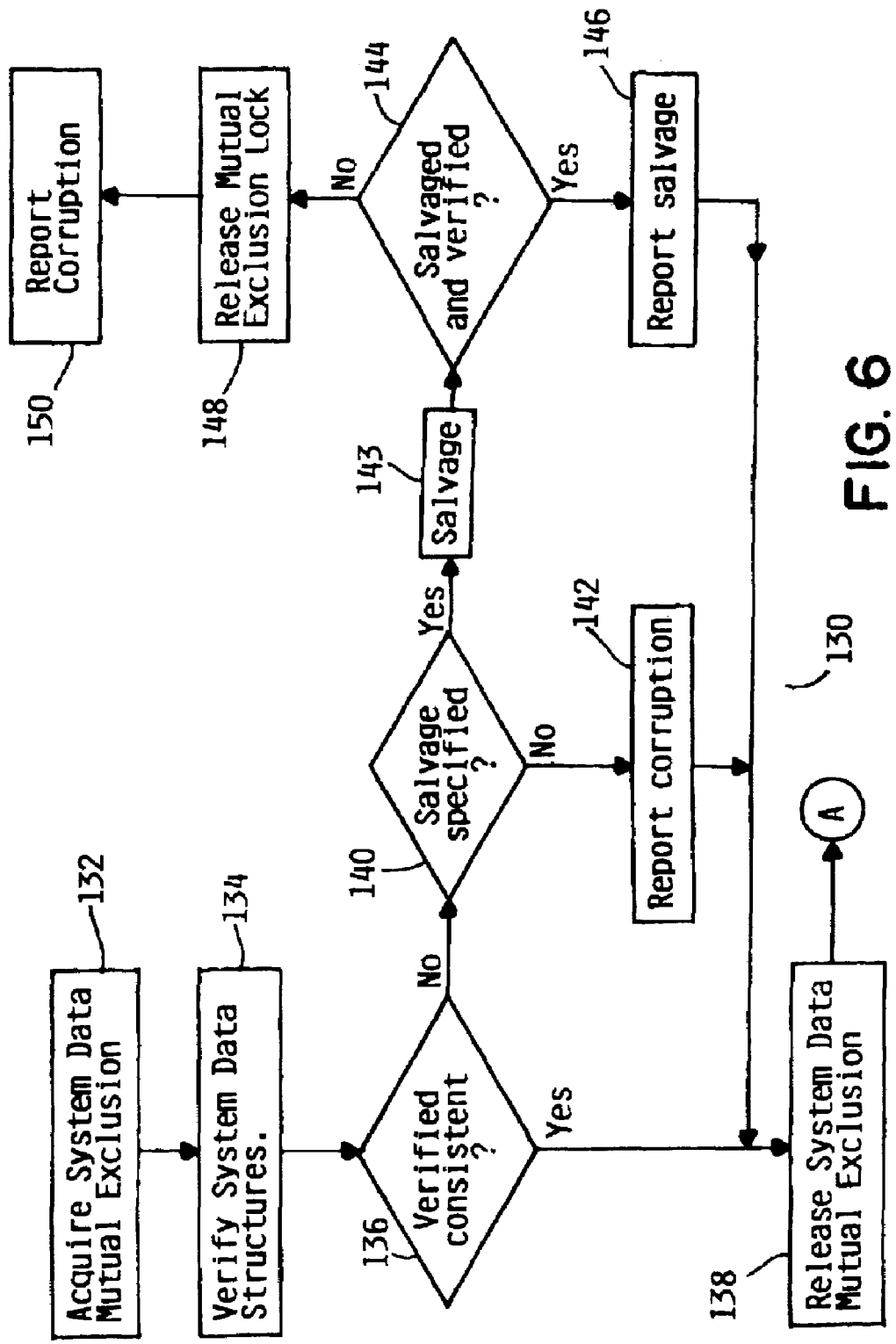
FIG. 6 is a flow chart illustrating the process of verifying consistency of system data structures of system metadata.

If at step 102 the operator indicated the consistency check to include system metadata, the system data structures are consistency checked following verification of the master cluster data structures. FIG. 6 is a flow chart 130 illustrating the process for conducting a consistency check on the system data structures. Following release of the mutual exclusion locks on the cluster master data structure at step 110, a mutual exclusion lock is obtained on the system data structures 132. Thereafter, verification of the system data structures is conducted 134. Following steps 132 and 134, a query is conducted to determine if the data in the data structures on which the mutual exclusion lock has been acquired at step 132 is consistent within the rules set for the data 136, i.e. is the data valid. A positive response to the query at step 136 will complete the consistency check on specified data, and the mutual exclusion lock on the system data structures is released 138. However, if it is determined that the consistency check of the system data structures is not consistent, then a subsequent query is conducted to determine if the operator authorized salvage of inconsistent data 140. If the operator did not request that the inconsistent data be salvaged, the corruption in the data is reported 142, and the mutual exclusion lock on the system data structures is released 138. Alternatively, if the operator requested that the inconsistent data be salvaged, a salvage of the inconsistent data is conducted 143. Following the salvage operation at step 143, a subsequent query is conducted to determine if the previously inconsistent data being verified has been salvaged and is now consistent 144. Salvage of the inconsistent data at step 143 will result in a production of a report of the salvage 146 followed by release of the mutual exclusion lock on the system data structures 138. However, if the inconsistent data could not be salvaged, the mutual exclusion lock is released 148, and the corruption of the data is reported to the operator 150. Accordingly, the steps outlined above describe the process for conducting a consistency check on mounted system data structures of system meta-data.

Figure 7:
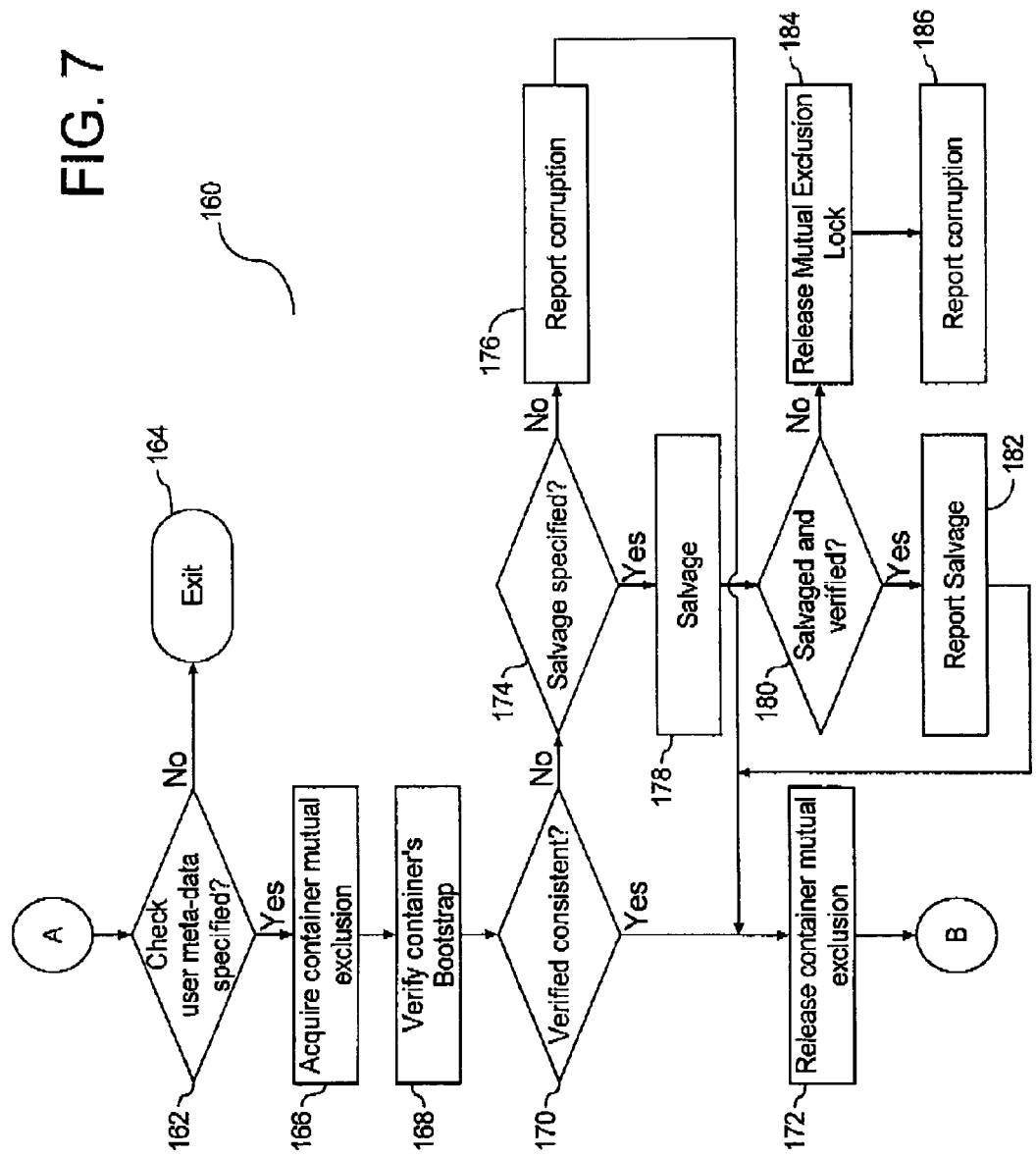
FIG. 7 is a flow chart illustrating the process of verifying consistency of a bootstrap of a logical portion of the global namespace.

At step 102 of FIG. 5, a query was conducted to determine if the operator specified the consistency check for system metadata. If the operator did not specify system metadata at step 102 or if the consistency check of the system metadata has concluded, a subsequent query is conducted to determine if the operator specified verification of user metadata 162. FIG. 7 is a flow chart 160 illustrating the process for conducting verification of user metadata. A negative response to the query at step 162 will result completion of the filesystem integrity check 164. However, a positive response to the query at step 162 will result in acquisition of a mutual exclusion lock for a logical portion of the global namespace specified by the operator 166. Thereafter, a verification of the bootstrap of the portion of the global namespace specified is conducted 168. Following steps 166 and 168, a query is conducted to determine if the data within the bootstrap of the logical portion of the global namespace is consistent within the rules set for the bootstrap 170, i.e. is the bootstrap valid. A positive response to the query at step 170 will complete the consistency check on logical portion of the global namespace, and the mutual exclusion lock on the logical portion of the global namespace is released 172. However, if it is determined that the bootstrap checked at step 170 is not consistent, then a subsequent query is conducted to determine if the operator authorized salvage of inconsistent data 174. If the operator did not request that the inconsistent data be salvaged, the corruption in the data is reported 176, and the mutual exclusion lock on the logical portion of the global namespace is released 172. Alternatively, it the operator requested that the inconsistent data from the bootstrap be salvaged, a salvage of the inconsistent data is conducted 178. Following the salvage operation at step 178, a subsequent query is conducted to determine if the previously inconsistent data being checked has been salvaged and is now consistent 180. Salvage of the inconsistent data at step 178 will result in a production of a report of the salvage 182 followed by release of the mutual exclusion lock on the logical portion of the global namespace 172. However, if the inconsistent data could not be salvaged, the mutual exclusion lock obtained at step 166 is released 184, and the corruption of the data is reported to the operator 186. Accordingly, the steps outlined above describes part of the process for conducting a consistency check on a mounted logical portion of the global namespace of the user metadata.

Figure 8:
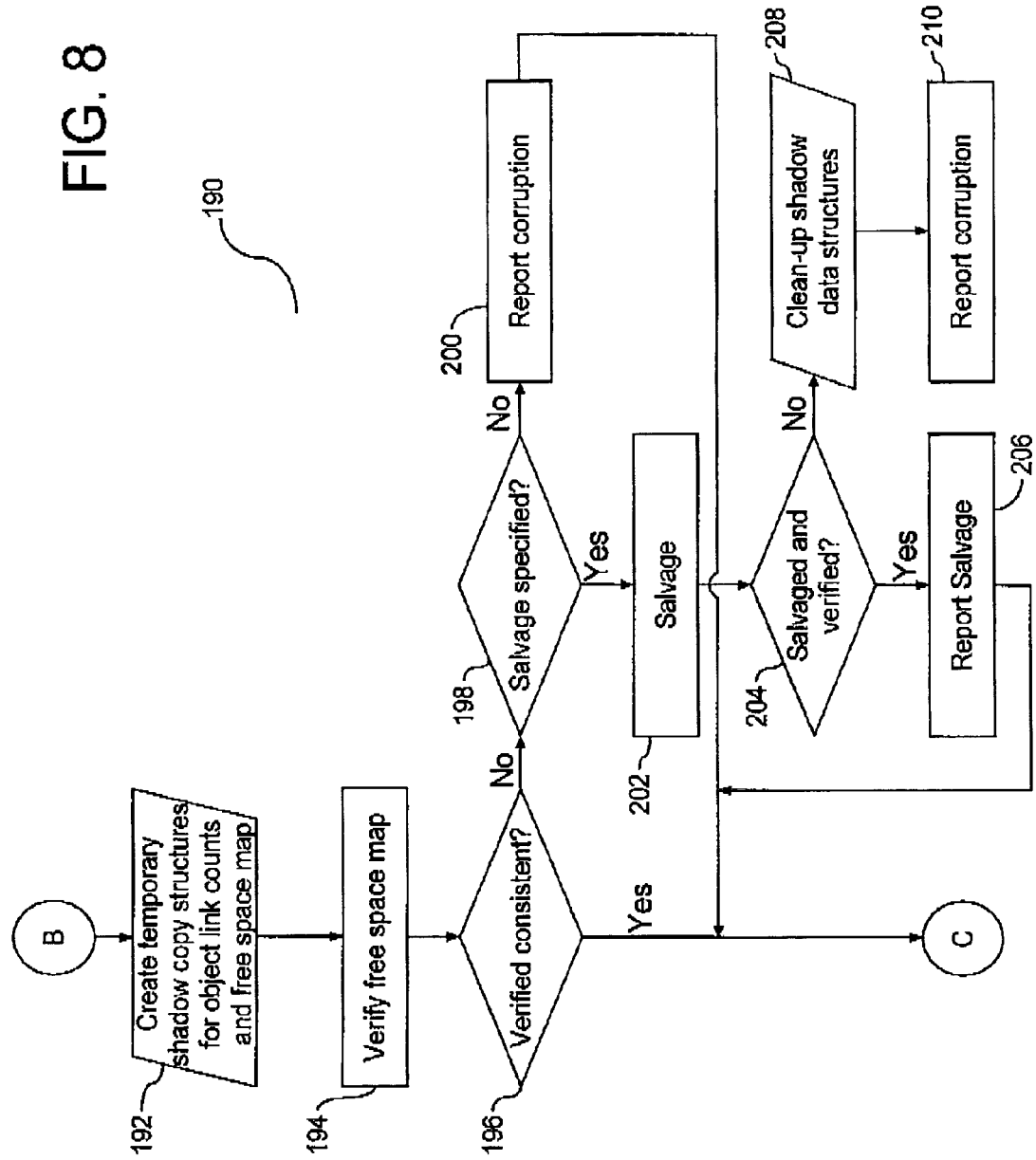
FIG. 8 is a flow chart illustrating the process of verifying consistency of a free space map of user metadata.

Following release of the mutual exclusion lock at step 172, the process of performing a consistency check on the user metadata continues. FIG. 8 is a flow chart 190 illustrating the process for verifying free space within the user meta data. A temporary shadow copy of specified data structures of the user metadata is created 192 and placed in persistent storage. Both the primary copy and the shadow copy of the specified data structures are maintained during the consistency cheek. Following creation of the shadow copy of the data structure, the free space map is verified 194. Each logical portion of the global namespace contains files with extent data structures that describe the objects used by the filesystem, i.e. describe the free space map. A query 196 is conducted to determine if the free space within the logical portion of the global namespace is consistent with the filesystem data. The consistency check at step 196 detects any orphaned blocks in the free space map. A positive response to the query at step 196 will complete the consistency check on the free space map. However, if it is determined that the free space of the filesystem data checked at step 196 is not consistent, then a subsequent query is conducted to determine if the operator authorized salvage of inconsistent data 198. If the operator did not request that the inconsistent data be salvaged, the corruption in the data is reported 200, and the consistency check on the free space map is complete. Alternatively, if the operator requested that the inconsistent data be salvaged, a salvage of the inconsistent data is conducted 202. Following the salvage operation at step 202, a subsequent query is conducted to determine if the previously inconsistent data being checked has been salvaged and is now consistent 204. Salvage of the inconsistent data at step 202 will result in a production of a report of the salvage 202 followed by completion of the consistency check on the free space map. However, if the inconsistent data could not be salvaged, the shadow data structures are removed from persistent storage 208, and corruption of the free space map is reported to the operator 210. Accordingly, the steps outlined above describes part of the process for conducting a consistency check on the free space map of a mounted logical portion of the global namespace of the user metadata.

Figure 10:
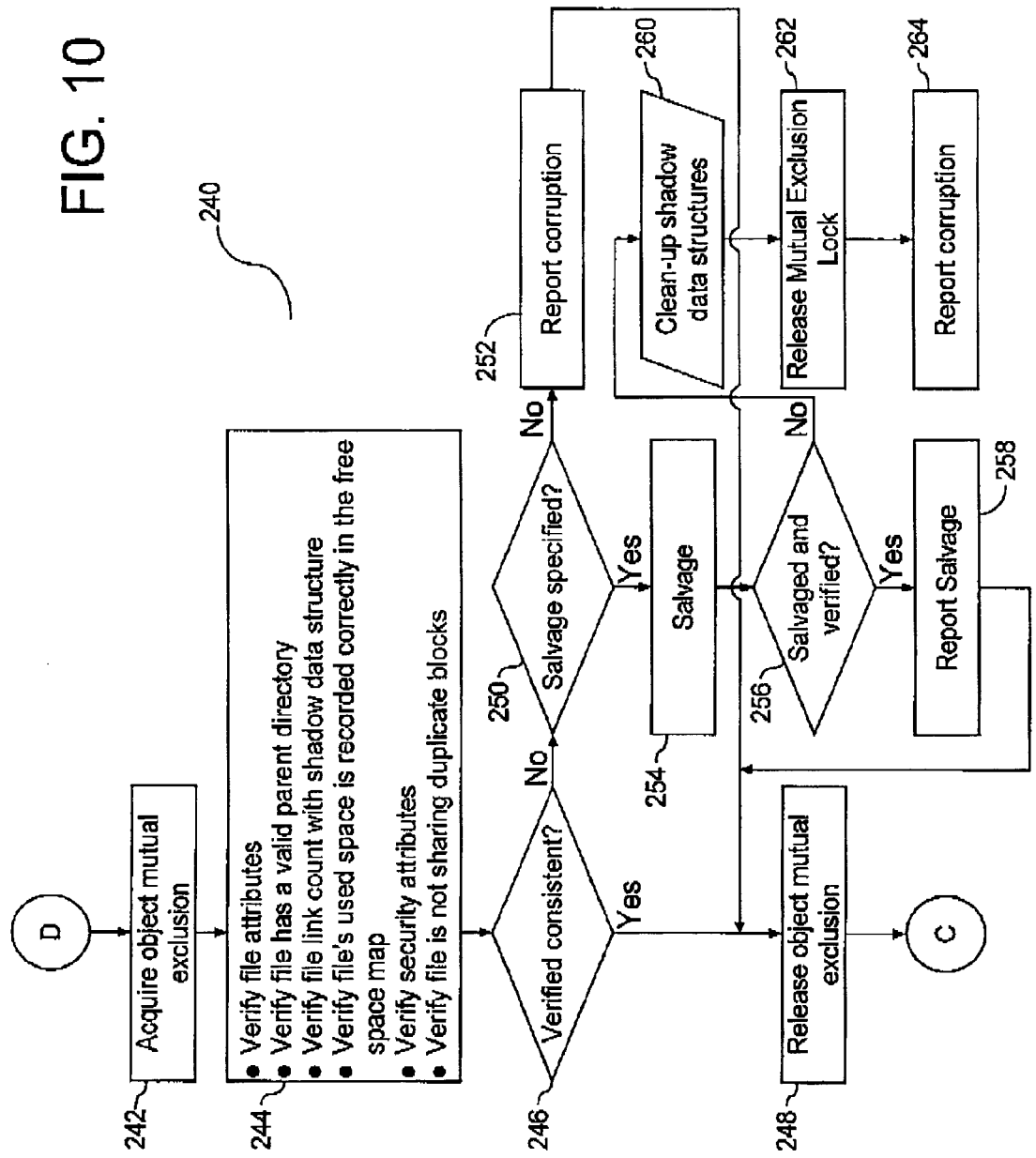
FIG. 10 is a flow chart illustrating the process of verifying consistency of an object file.

A positive response to the query at step 232, will result in verification of the data in the file specified as it will have been determined that the object is a file. FIG. 10 is a flow chart 240 illustrating the process of conducting a consistency check on a file. A mutual exclusion lock is obtained on the file 242. Thereafter, verification of the file attributes is conducted 244. File attributes include verification tat a valid parent directory exists within the filesystem, that it's link count matches with the shadow data structure for the file, correct recordation of the file's extents in the free space map, the file is not sharing duplicate blocks with another file, and any security attributes of the file are within a range of acceptable values or possess a certain characteristic. A query 246 is conducted to determine if the file attributes verified at step 224 fall within a predefined range of value. A positive response to the query at step 246 will complete the consistency check on the file attributes and release the mutual exclusion lock on the specified file 248. However, if it is determined that the file attributes checked at step 246 is not consistent, then a subsequent query is conducted to determine if the operator authorized salvage of inconsistent file attributes 250. If the operator did not request that the inconsistent file attributes be salvaged, the corruption in the file attributes is reported 252, followed by release of the mutual exclusion lock on the specified file 248 Alternatively, if the operator requested that the inconsistent file attributes be salvaged, a salvage of the inconsistent data is conducted 254. Following the salvage operation at step 254, a subsequent query is conducted to determine if the previously inconsistent file attributes being checked has been salvaged and is now consistent 256. Salvage of the inconsistent file attributes at step 254 will result in a production of a report of the salvage 258 followed by release of the mutual exclusion lock on the specified file 248. If the inconsistent data could not be salvaged at step 256, the shadow data structures on the file are removed from persistent storage 260, followed by release of any mutual exclusion locks that may not have been previously released 262 and a report of corruption of the file to the operator 264. Accordingly, the steps outlined above describes part of the process for conducting a consistency check on a specified file of a filesystem object in a mounted logical portion of the global namespace of the user metadata.

A positive response to the query at step 232, will result in verification of the data in the file specified as it will have been determined that the object is a file. FIG. 10 is a flow chart 240 illustrating the process of conducting a consistency check on a file. A mutual exclusion lock is obtained on the file 242. Thereafter, verification of the file attributes is conducted 244. File attributes include verification tat a valid parent directory exists within the filesystem, that it's link count matches with the shadow data structure for the file, correct recordation of the file's extents in the free space map, the file is not sharing duplicate blocks with another file, and any security attributes of the file are within a range of acceptable values or possess a certain characteristic. A query 246 is conducted to determine if the file attributes verified at step 224 fall within a predefined range of value. A positive response to the query at step 246 will complete the consistency check on the file attributes and release the mutual exclusion lock on the specified file 248. However, if it is determined that the file attributes checked at step 246 is not consistent, then a subsequent query is conducted to determine if the operator authorized salvage of inconsistent file attributes 250. If the operator did not request that the inconsistent file attributes be salvaged, the corruption in the file attributes is reported 252, followed by release of the mutual exclusion lock on the specified file 248 Alternatively, if the operator requested that the inconsistent file attributes be salvaged, a salvage of the inconsistent data is conducted 254. Following the salvage operation at step 254, a subsequent query is conducted to determine if the previously inconsistent file attributes being checked has been salvaged and is now consistent 256. Salvage of the inconsistent file attributes at step 254 will result in a production of a report of the salvage 258 followed by release of the mutual exclusion lock on the specified file 248. If the inconsistent data could not be salvaged at step 256, the shadow data structures on the file are removed from persistent storage 260, followed by release of any mutual exclusion locks that may not have been previously released 262 and a report of corruption of the file to the operator 264. Accordingly, the steps outlined above describes part of the process for conducting a consistency check on a specified file of a filesystem object in a mounted logical portion of the global namespace of the user metadata.

Figure 11:
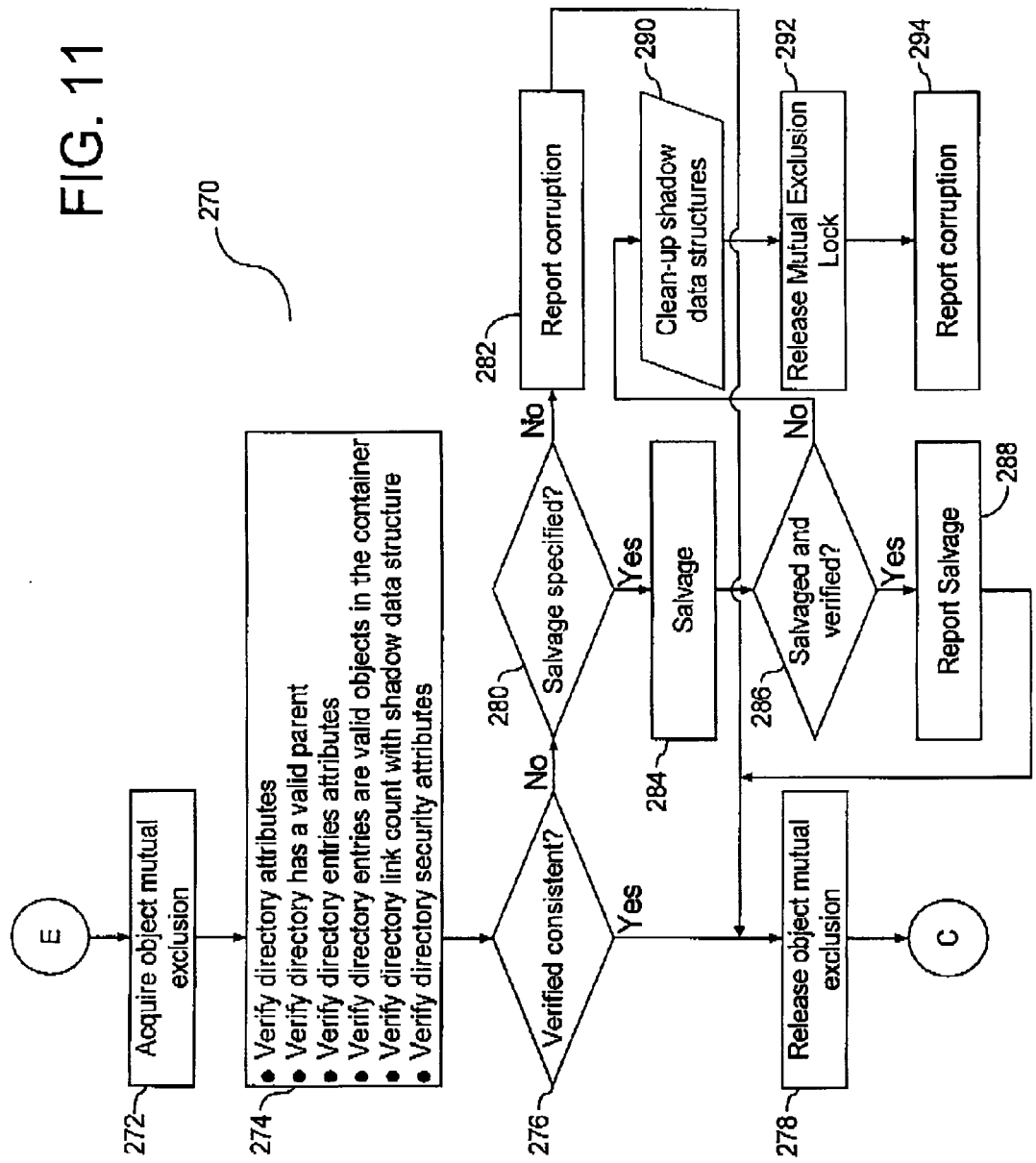
FIG. 11 is a flow chart illustrating the process of verifying consistency of an object directory.

A positive response to the query at step 234, will result in verification of the data in the directory specified as it will have been determined that the object is a directory. FIG. 11 is a flow chart 270 illustrating the process of conducting a consistency check ott a filesystem directory. A mutual exclusion lock is obtained on the directory 272. Thereafter, verification of the directory attributes is conducted 274. Directory attributes include the following: a valid parent directory, directory entries, valid objects in the logical portion of the global namespace, it's link count matches with the shadow data structure for the directory, and security attributes. A query 276 is conducted to determine if the directory attributes verified at step 274 fall within a predefined range of values. A positive response to the query at step 276 will complete the consistency check on the directory and release the mutual exclusion lock on the specified directory 278. However, if it is determine that the directory checked at step 276 is not consistent with the predefined range of values, then a subsequent query is conducted to determine if the operator authorized salvage of inconsistent data 280. If the operator did not request that inconsistent data be salvaged, the corruption in the directory is reported 282, followed by release of the mutual exclusion lock on the specified directory 278. Alternatively, if the operator requested that the inconsistent directory be salvaged, a salvage of the inconsistent data is conducted 284. Following the salvage operation at step 263, a subsequent query is conducted to determine if the previously inconsistent directory being checked has been salvaged and is now consistent 286. Salvage of the inconsistent directory at step 263 will result in a production of a report of the salvage 288 followed by release of the mutual exclusion lock on the specified directory 278. If the inconsistent directory could not be salvaged, the shadow data structures are removed from persistent storage 290, followed by release of any mutual exclusion lock that may not have been previously released 292 and a report of corruption of the directory to the operator 294. Accordingly, the steps outlined above describes part of the process for conducting a consistency check on a specified directory of a filesystem object in a mounted logical portion of the global namespace of the user metadata.

Figure 9:
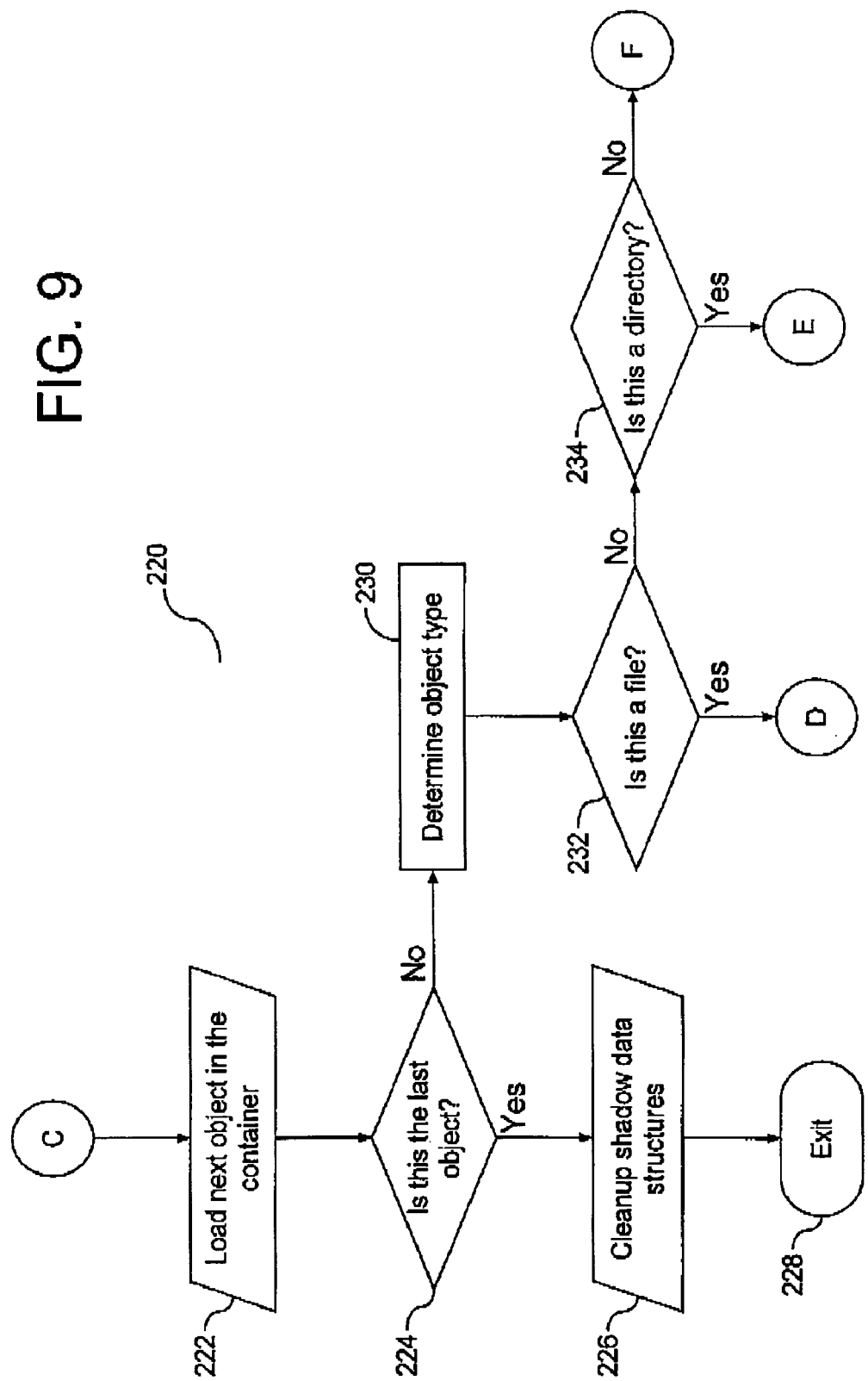
FIG. 9 is a flow chart illustrating the process of determining the type of the object in the user metadata to be verified.
Figure 12:
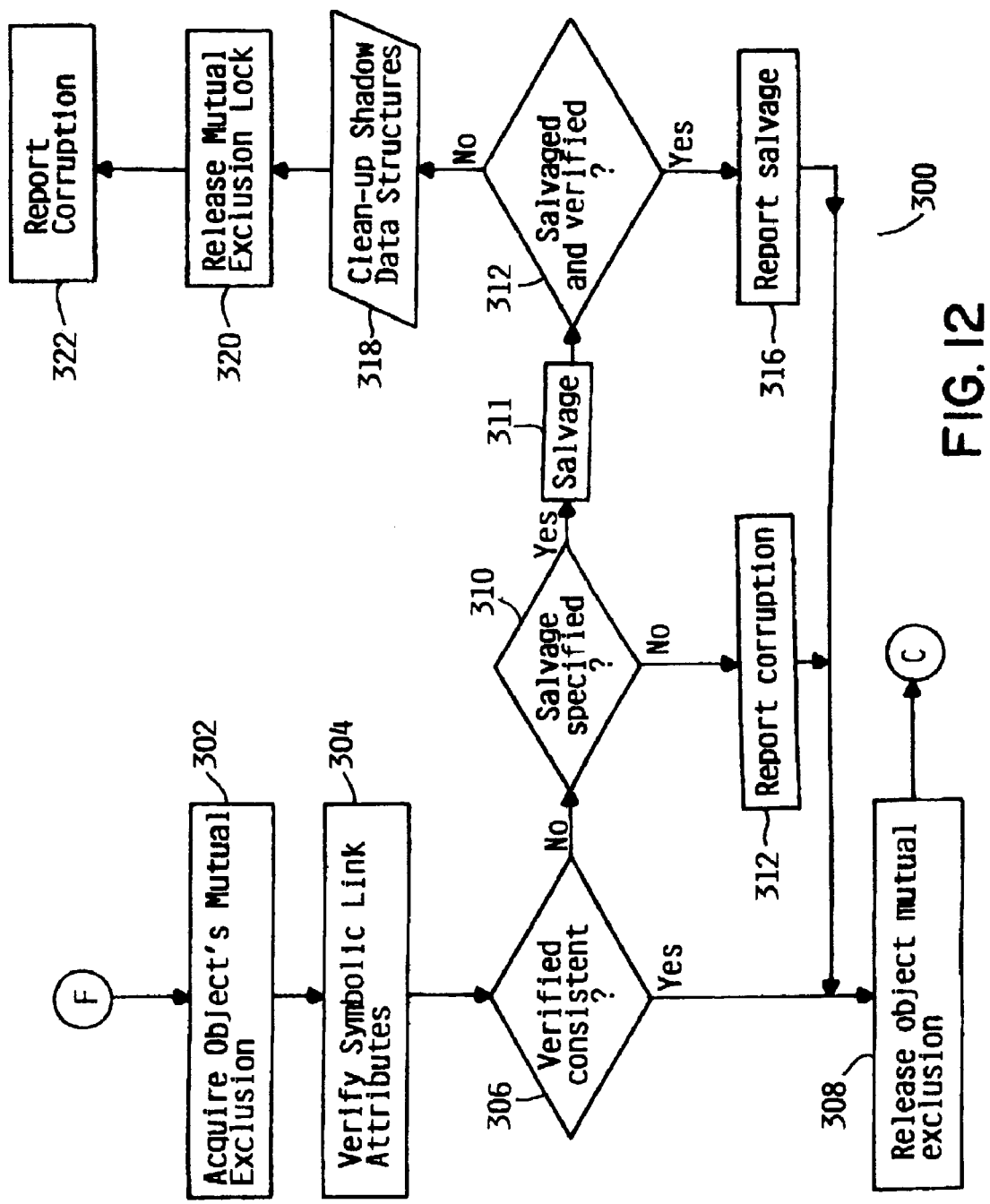
FIG. 12 is a flow chart illustrating the process of verifying consistency of an object symbolic link.

If at steps 212 and 214 of FIG. 9, it is determined that the object type is neither a file nor a directory, then the object is a symbolic link. FIG. 12 is a flow chart 300 illustrating the process of conducting a consistency check on a symbolic link. A mutual exclusion lock is obtained on the symbolic link of the object 302. Thereafter, a verification of the symbolic link attributes is conducted 304. Following steps 302 and 304, a query is conducted to determine if the symbolic link is consistent within the rules set for the link 306, i.e. is the symbolic link valid. A positive response to the query at step 306 will complete the consistency check on the symbolic link, and the mutual exclusion lock on the symbolic link is released 308. However, if it is determined that the data checked at step 306 is not consistent, then a subsequent query is conducted to determine if the operator authorized salvage of inconsistent data 310. If the operator did not request that inconsistent data be salvaged, the corruption in the data is reported 312, and the mutual exclusion lock on the symbolic link is released 308. Alternatively, if the operator requested that the inconsistent data be salvaged, a salvage of the inconsistent data is conducted 311. Following the salvage operation at step 311, a subsequent query is conducted to determine if the previously inconsistent data being checked has been salvaged and is now consistent 314. Salvage of the inconsistent data at step 311 will result in a production of a report of the salvage 316 followed by release of the mutual exclusion lock on the symbolic link 308. However, if the inconsistent data from the symbolic link could not be salvaged, the shadow data structures are removed from persistent storage 318, followed by release of any mutual exclusion lock that may not have been previously released 320 and the corruption of the data is reported to the operator 322. Accordingly, the steps outlined above describes part of the process for conducting a consistency check on a mounted portion of the global namespace of the user metadata.

Following release of the mutual exclusion lock from steps 228, 258, and 308, the process returns to step 202 of FIG. 9 to determine if there are additional objects in the logical portion of the global namespace to be verified for consistency. For each object specified in the user metadata, it must be determined whether the object is a file, a directory, or a symbolic link, and an appropriate verification and review of the object is conducted as outlined above. After the object has been identified and verified, the mutual exclusion lock on the specified object is released and the shadow copy of the data structure is removed from persistent storage.

Advantages Over the Prior Art

The process for checking the integrity of specified system or user metadata operates within the metadata server node. This enables access to all of the internal data structures of the metadata, as well as access to mutual exclusion primitives. Verification of the metadata specified is conducted in conjunction with a mutual exclusion lock on an associated data structure, thereby protecting the data structure being verified. The locked metadata is verified and/or salvaged in an automated manner without requiring manual intervention, wherein the metadata may be system, user metadata, and/or a portion of the user metadata. Accordingly, the process for conducting an integrity check of the metadata includes obtaining use of mutual exclusion primitives and conducting the integrity check while the filesystem is mounted.

Alternative Embodiments

It will be appreciated that, although specific embodiments of the invention have been described herein for purposes of illustration, various modifications may be made without departing from the spirit and scope of the invention. In particular, a fuzzy consistency check may be implemented to verify metadata while the filesystem is mounted. However, a mutual exclusion primitive is not invoked on the metadata being verified. The fuzzy consistency check is preferably implemented for metadata that requires an extended period of time, and therefore a mutual exclusion primitive on the associated metadata is not possible. The fuzzy consistency check determines whether the metadata falls within a defined boundary. Accordingly, the scope of protection of this invention is limited only by the following claims and their equivalents.

We claim:
1. A method for reviewing a data storage system, comprising:
   providing a file system to communicate with metadata of local storage media of a node;
   obtaining a mutual exclusion lock on select metadata;
   performing an automated consistency check on said locked metadata to determine if data within a data structure on which said lock has been obtained is valid, while said file system is mounted, including creating a temporary shadow copy of specified data structures of user metadata, and detecting elements selected from a group consisting of: orphaned objects in data provided by said shadow copy, and blocks in a free space map from data provided by said shadow copy;
   performing an automated salvage of inconsistent locked and mounted metadata to attempt to make said inconsistent data valid; and
   reporting corruption of inconsistent data to an operator.
2. The method of claim 1, wherein said blocks are selected from a group consisting of: orphaned blocks and duplicate blocks.
3. The method of claim 1, wherein said metadata is selected from a group consisting of: system metadata, user metadata, a portion of said user metadata, and combinations thereof.
4. A data storage review system comprising:
   memory and a processor in communication with storage media;
   a file system reviewer adapted to communicate with metadata of local storage media of a node;

a mutual exclusion lock adapted to be obtained on select metadata;

a review manager adapted to conduct an automated consistency check on locked metadata to determine if within said a data structure on which said lock has been obtained is valid, while said file system is mounted, wherein said review manager detects elements selected from a group consisting of: orphaned objects in data provided by a shadow copy of specified user metadata, and blocks in a free space map provided by a shadow copy of user specified metadata;

a salvage manager to conduct an automated salvage of inconsistent locked and mounted metadata and to attempt to make said inconsistent data valid; and a report to communicate corrupted data to an operator.

5. The system of claim 4, wherein said blocks are selected from a group consisting of: orphaned blocks and duplicate blocks.

6. The method of claim 4, wherein said metadata is selected from a group consisting of: system metadata, user metadata, a portion of said user metadata, and combinations thereof.

7. An article comprising:

a computer-readable storage medium;

means in the medium for running a file system reviewer is adapted to communicate with metadata of local storage media of a node;

means in the medium for obtaining a mutual exclusion lock on select metadata;

means in the medium for performing an automated consistency check on locked metadata to determine if data within a data structure on which said lock has been obtained is valid, while said file system is mounted, including creating a temporary shadow copy of specified data structures of user metadata, and detecting elements selected from a group consisting of: orphaned objects in data provided by said shadow copy, and blocks in a free space map from data provided by said shadow copy;

means in the medium for performing an automated salvage of inconsistent locked and mounted metadata to attempt to make said inconsistent data valid; and reporting corruption of inconsistent data to an operator.

8. The article of claim 7, wherein the medium is a recordable data storage medium.

9. The article of claim 7, wherein said blocks are selected from a group consisting of: orphaned blocks and duplicate blocks.

10. The method of claim 7, wherein said metadata is selected from a group consisting of: system metadata, user metadata, a portion of said user metadata, and combinations thereof.

11. A method for reviewing a data storage system comprising:

obtaining a mutual exclusion lock on select metadata; and performing an automated consistency check on said locked metadata while said file system is mounted to determine validity of data within a locked data structure;

creating a shadow copy of a specific data structure of user metadata, wherein said shadow copy is selected from a group consisting of object link counts, free space map, and combinations thereof;

detecting blocks in a free space map from data provided by said shadow copy, wherein said blocks are selected from a group consisting of: duplicate blocks and orphaned blocks;

performing an automated salvage of inconsistent locked and mounted metadata to attempt to make said locked and mounted data valid; and reporting inconsistent data to an operator.

12. The method of claim 11, wherein said meta data is selected from a group consisting of: system metadata, user metadata, a portion of said user metadata, and combinations thereof.

13. A data storage review system comprising:

memory and a processor;

a mutual exclusion lock adapted to be obtained on select metadata;

a review manager adapted to conduct an automated consistency check on said locked metadata while said file system is mounted to determine validity of data within a locked data structure;

a shadow copy of a specific data structure of user metadata created in response to preparation for said consistency check, wherein said review manager detects blocks in a free space map from data provided by said shadow copy of user metadata, wherein said blocks are selected from a group consisting of: orphaned blocks and duplicate blocks;

a salvage manager adapted to conduct an automated salvage of inconsistent locked metadata to attempt to make said data valid; and a report to communicate corrupted data to an operator.

14. The system of claim 13, wherein said shadow copy is selected from a group consisting of: object link counts, free space map, and combinations thereof.

15. The system of claim 13, wherein said review manager is adapted to detect orphaned objects in data provided by said shadow copy of a data structure of user metadata.

16. The system of claim 13, wherein said metadata is selected from a group consisting of: system metadata, user metadata, a portion of said user metadata, and combinations thereof.

17. An article comprising:

a computer-readable storage medium;

means in the medium for obtaining a mutual exclusion lock on select metadata; and means in the medium for performing an automated consistency check on said locked metadata while said file system is mounted, wherein said consistency check includes determining if data associated with said locked metadata is valid;

means in the medium for performing an automated salvage of inconsistent locked and mounted metadata to attempt to make said data valid means in the medium for creating a shadow copy of a specific data structure of user metadata, and for detecting blocks in a free space map from data provided by said shadow copy of said user metadata, wherein said blocks are selected from a group consisting of: duplicate blocks and orphaned blocks; and reporting inconsistent data to an operator.

18. The article of claim 17, wherein the medium is a recordable data storage medium.

19. The article of claim 17, wherein said means for performing a consistency check on mounted metadata includes a review manager.

20. The article of claim 17, wherein said metadata is selected from a group consisting of: system metadata, user metadata, a portion of said user metadata, and combinations thereof.

* * * * *